(12) United States Patent  (10) Patent No.: US 7,505,289 B2
Kim et al. (45) Date of Patent: Mar. 17, 2009

(54) FLYBACK DC/DC CONVERTER USING CLAMP DIODE

(75) Inventors: Don Sik Kim, Kyungki-do (KR); Sug Chin Sakong, Seoul (KR); Sung Soo Hong, Kyungki-do (KR); Chung Wook Roh, Seoul (KR); Sang Kyoo Han, Daejeon (KR); Young Seung Roh, Kyungki-do (KR); Kwang Seung Cho, Kyungki-do (KR)

(73) Assignee: Samsung Electro-Mechanics Co., Ltd., Suwon, Kyungki-Do (KR)

( * ) Notice: Subject to any disclaimer, the term of this patent is extended or adjusted under 35 U.S.C. 154(b) by 293 days.

(21) Appl. No.: 11/565,549

(22) Filed: Nov. 30, 2006

(65) Prior Publication Data

US 2007/0183172 A1 Aug. 9, 2007

(30) Foreign Application Priority Data

Feb. 3, 2006 (KR) .................... 10-2006-0010868

(51) Int. Cl.
*H02H 7/125* (2006.01)
*H02M 3/335* (2006.01)
(52) U.S. Cl. .................. 363/52; 363/21.12; 363/126
(58) Field of Classification Search ............. 363/20, 363/21.12, 21.14, 52, 53, 54, 84, 125–128
See application file for complete search history.

(56) References Cited

U.S. PATENT DOCUMENTS

| 5,351,179 | A | * | 9/1994 | Tsai et al. ..................... 363/53 |
| 5,684,426 | A | | 11/1997 | De Doncker |
| 5,898,581 | A | * | 4/1999 | Liu ............................. 363/53 |
| 6,333,861 | B1 | * | 12/2001 | Goodman .................... 363/20 |
| 7,184,287 | B2 | * | 2/2007 | Ying et al. .................. 363/126 |
| 2007/0195566 | A1 | * | 8/2007 | Nielsen et al. ................ 363/53 |

* cited by examiner

*Primary Examiner*—Jessica Han
(74) *Attorney, Agent, or Firm*—Lowe Hauptman Ham & Berner

(57) ABSTRACT

Provided is a flyback DC/DC converter for a power supply. In the flyback DC/DC converter, a flyback driver unit provides a primary current. A transformer includes a plurality of secondary coils for inducing energy from the primary coil receiving the primary current. A rectifier unit includes a plurality of rectifier diodes for rectifying secondary currents of the corresponding secondary coils of the transformer. A plurality of clamp diodes are connected in series to the corresponding rectifier diodes of the rectifier unit in a forward direction to clamp ringing voltage across the corresponding rectifier diodes when the power switch is turned off. Accordingly, the voltage across the rectifier diode on the secondary side can be reduced such that it is lower than the output voltage. Also, it is possible to remove the ringing voltage of the rectifier diode and to enhance the efficiency of the flyback DC/DC converter.

11 Claims, 15 Drawing Sheets

(a)

(b)

$$V_{in\_max} \frac{N_s}{N_p} < V_{o\_min} \equiv \frac{V_{in\_max}}{V_{o\_min}} < \frac{N_p}{N_s}$$

FLYBACK DC/DC CONVERTER USING CLAMP DIODE

RELATED APPLICATION

The present application is based on, and claims priority from, Korean Application Number 2006-10868, filed Feb. 3, 2006, the disclosure of which is hereby incorporated by reference herein in its entirety.

BACKGROUND OF THE INVENTION

1. Field of the Invention

The present invention relates to a flyback DC/DC converter for a power supply, and more particularly, to a flyback DC/DC converter in which a voltage across a rectifier diode on the secondary side can be reduced such that it is lower than the output voltage. In the flyback DC/DC converter, the ringing voltage of the rectifier diode can be removed to reduce a voltage stress remarkably. In addition, the efficiency of the flyback DC/DC converter can be enhanced because a snubber circuit is unnecessary.

2. Description of the Related Art

A flyback DC/DC converter has been proposed as being very suitable for a low-priced power converter that converts a DC input voltage into a DC output voltage. The flyback DC/DC converter is used in a power supply such as a switching mode power supply (SMPS). However, a conventional flyback DC/DC converter must be implemented using expensive and high-performance semiconductor derives because voltage stresses on a switch and an output diode are too high.

In addition, the conventional flyback DC/DC converter must be equipped with an RCD or an RC snubber because a high ringing voltage is generated when a power switch and a rectifier diode is turned off. Such a snubber causes a high signal loss, thus degrading the system efficiency.

Meanwhile, a flyback converter is an isolation type of a buck-boost converter. Except an I/O voltage conversion ratio, the principal operations are identical to those of the buck-boost converter.

FIG. 1 is a circuit diagram of a conventional flyback DC/DC converter.

Referring to FIG. 1, the conventional fly back DC/DC converter is simple in structure and includes a flyback driver unit 10, a transformer 20, a rectifying diode D1, an output capacitor Co, and an RC snubber 30. The flyback driver unit 10 controls an internal power switch M by a pulse width modulation (PWM) scheme or by a pulse frequency modulation (PFM) scheme to supply a primary voltage Vpr. The transformer 20 transforms the primary voltage Vpr received from the flyback driver unit 10 into a secondary voltage Vse depending on a turn ratio of a primary coil Lpr to a secondary coil Lse. The rectifying diode D1 rectifies the secondary voltage Vse received from the transformer 20. The output capacitor Co smoothes an output voltage of the rectifying diode D1. The RC snubber 30 removes a ringing voltage of the rectifying diode D1.

The transformer 20 includes a magnetization inductor Lm and a leakage inductor Llkg. The magnetization inductor Lm is connected in parallel to the primary coil Lpr to exhibit a magnetization of a magnetic core. The leakage inductor Llkg is located on the path of a primary current ipr due to the leakage of the magnetic flux of the transformer 20.

When the power switch M using a metal oxide silicon field effect transistor (MOSFET) is turned on, a high ringing voltage is generated at the rectifying diode D1. That is, when the rectifying diode D1 is turned off by the turn on of the power switch M, the leakage inductor Llkg of transformer 20 resonates with a junction capacitor (Cj) of the rectifying diode D1, thereby inducing the high ringing voltage. The RC snubber 30 is used to reduce such a surge-type ringing voltage. The RC snubber 30 may include a resistor R1 and a capacitor C1.

The transformer 20 is automatically reset by an output voltage. Therefore, the conventional flyback DC/DC converter needs no additional reset circuit and thus is very suitable for a low-priced power source.

An operation of the above conventional flyback DC/DC converter will now be described with reference to FIGS. 1 and 2.

FIG. 2 is a waveform diagram of the main signals of the convention flyback DC/DC converter illustrated in FIG. 1.

Referring to FIGS. 1 and 2, a switching signal SW alternates between a high level and a low level in accordance with a PWM scheme or a PFM scheme. Thus, a state SM of the power switch M in the flyback driver unit 10 alternates between an on state and an off state. The switching operation of the power switch M causes the primary current ipr to be input into the primary coil Lpr of the transformer 20. Accordingly, a secondary current ise flows through the secondary coil Lse of the transformer 20.

A drain-source voltage Vds of the power switch M using a MOSFET changes into a low level when the power switch M is turned on. On the other hand, the drain-source voltage Vds of the power switch M changes into a high level when the power switch M is turned off. In addition, a voltage Vd1 across the rectifying diode D1 changes into a low level when the drain-source voltage Vds changes into a high level. On the other hand, the voltage Vd1 changes into a high level when the drain-source voltage Vds changes into a low level.

Referring to FIG. 2, when the power switch M is turned off, a current $i_{LM}$ and a current $Ni_{LM}$ flow through the magnetization inductor Lm when viewed respectively from the primary and secondary sides of the transformer 20. The current $i_{LM}$ and the current $Ni_{LM}$ serve as magnetization currents for the magnetic core.

However, a voltage stress on the rectifying diode D1 of the flyback driver unit 10 is so high as "Vin/N+Vo". Moreover, the ringing voltage generated due to the resonance of the leakage inductor Llkg and the junction capacitor Cj is added to the voltage stress on the rectifying diode D1. Therefore, a serious ringing voltage is generated at the both terminals of the rectifying diode D1. An additional RC snubber is further provided to absorb the serious ringing voltage. Even in this case, a ringing voltage still remains and a power loss occurs due to the RC snubber.

When a voltage across the rectifying diode increases due to the ringing voltage, the rectifying diode must have a higher breakdown voltage. However, the rectifying diode becomes more expensive with an increase in its breakdown voltage.

As described above, because a magnetization current of the transformer 20 has an offset of a load current, the availability of the transformer 20 decreases in the conventional flyback DC/DC converter. In addition, when the conventional flyback DC/DC converter has a high operating frequency and a large load capacity, it must be equipped with a separate auxiliary circuit for soft switching. Moreover, the conventional flyback DC/DC converter has a large-ripple output voltage due to its discontinuous output current.

SUMMARY OF THE INVENTION

Accordingly, the present invention is directed to a flyback DC/DC converter using clamp diodes that substantially obviates one or more problems due to limitations and disadvantages of the related art.

An object of the present invention is to provide a flyback DC/DC converter in which a voltage across a rectifier diode on the secondary side can be reduced such that it is under the output voltage. In the flyback DC/DC converter, the ringing voltage of the rectifier diode can be removed to reduce a voltage stress remarkably. In addition, the efficiency of the flyback DC/DC converter can be enhanced because a snubber circuit is unnecessary.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a flyback DC/DC converter that has a smoothing output capacitor connected between a positive output terminal and a negative output terminal and performs a DC/DC conversion operation using a power switch, the flyback DC/DC converter including: a flyback driver unit for providing a primary current; a transformer including a plurality of secondary coils for inducing energy from the primary coil receiving the primary current; a rectifier unit including a plurality of rectifier diodes for rectifying secondary currents of the corresponding secondary coils of the transformer; and a plurality of clamp diodes connected in series to the corresponding rectifier diodes of the rectifier unit in a forward direction to clamp ringing voltage across the corresponding rectifier diodes when the power switch is turned off.

The transformer may include: a first secondary coil having one end connected to the positive output terminal and inducing energy from the primary coil; and a second secondary coil connected between the negative output terminal and the other end of the first secondary coil to induce energy from the primary coil.

The rectifier unit may include: a first rectifier diode connected between the positive output terminal and the first secondary coil of the transformer; a second rectifier diode connected between the negative output terminal and the second secondary coil of the transformer; and an intermediate rectifier diode unit connected between the first secondary coil and the second secondary coil of the transformer.

The intermediate rectifier diode unit may include a third rectifier diode connected between the first secondary coil and the second secondary coil of the transformer.

The clamp circuit unit may include: a first clamp diode connected between the negative output terminal and the first rectifier diode to clamp a ringing voltage across the first rectifier diode; a second clamp diode connected between the positive output terminal and the second rectifier diode to clamp a ringing voltage across the second rectifier diode; a third clamp diode connected between the positive output terminal and the intermediate rectifier diode unit; and a fourth clamp diode connected between the negative output terminal and the intermediate rectifier diode unit to clamp a ringing voltage across the intermediate rectifier diode unit in cooperation with the third clamp diode.

The intermediate rectifier diode unit may include a third rectifier diode and a fourth rectifier diode that are connected in series between the first secondary coil and the second secondary coil.

The clamp circuit unit may include: a first clamp diode connected between the negative output terminal and the first rectifier diode to clamp a ringing voltage across the first rectifier diode; a second clamp diode connected between the positive output terminal and the second rectifier diode to clamp a ringing voltage across the second rectifier diode; a third clamp diode connected between the positive output terminal and the third rectifier diode unit; and a fourth clamp diode connected between the negative output terminal and the fourth rectifier diode to clamp a ringing voltage across the third and fourth rectifier diodes in cooperation with the third clamp diode.

The clamp circuit unit may further include a first capacitor and a second capacitor for dividing an output voltage between the positive output terminal and the negative output terminal, a connection node between the first and second capacitors being connected to a connection node between the third and fourth rectifier diodes.

The first capacitor and the second capacitor may be set to have the same value such that a voltage across the third rectifier diode is equal to a voltage across the fourth rectifier diode.

The rectifier unit may be set such that the maximum input voltage is lower than the minimum output voltage.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
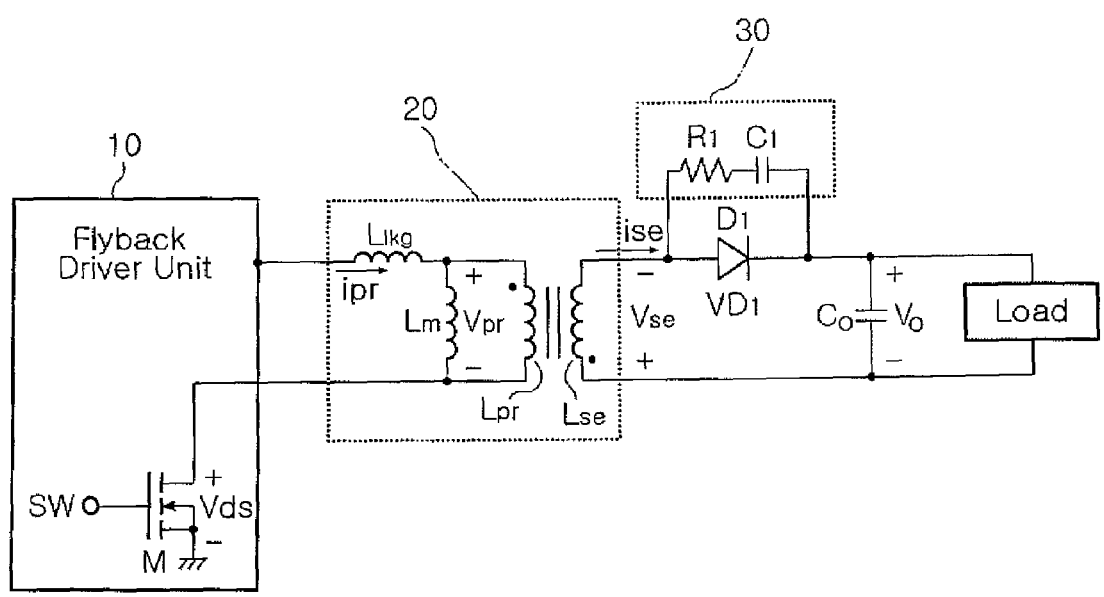
FIG. 1 is a circuit diagram of a conventional flyback DC/DC converter.

Reference will now be made in detail to the preferred embodiments of the present invention, examples of which are illustrated in the accompanying drawings. Like reference numerals in the drawings denote like elements, and thus their description will be omitted.

Figure 3:
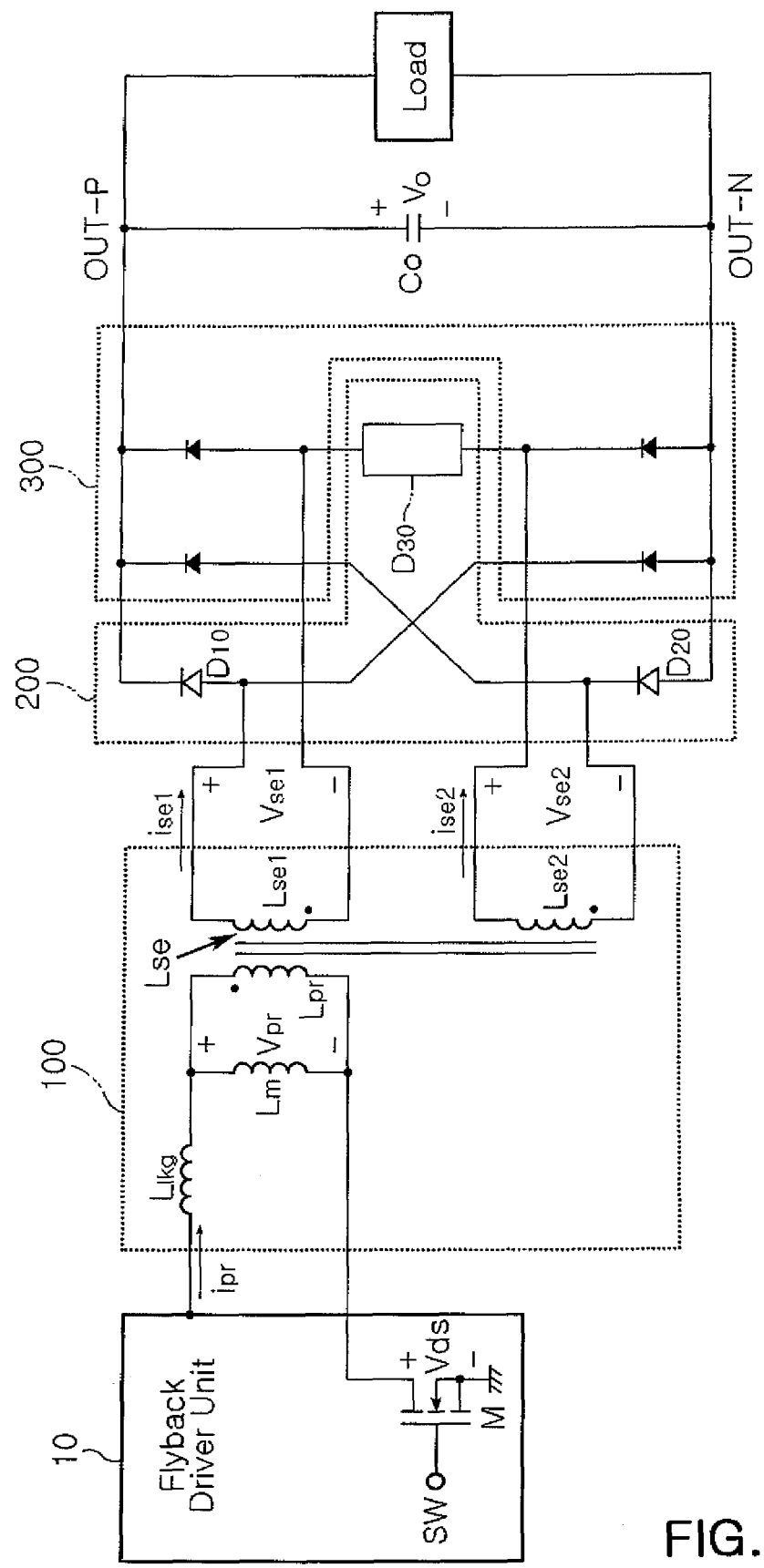
FIG. 3 is a schematic circuit diagram of a flyback DC/DC converter according to an embodiment of the present invention.

FIG. 3 is a schematic circuit diagram of a flyback DC/DC converter according to an embodiment of the present invention.

Referring to FIG. 3, a flyback DC/DC converter according to the present invention has a smoothing output capacitor Co connected between a positive output terminal OUT-P and a negative output terminal OUT-N, and performs DC/DC conversion using a power switch M. The flyback DC/DC converter includes a flyback driver unit 10, a transformer 100, a rectifier unit 200, and a clamp circuit unit 300.

The flyback driver unit 10 includes the power switch M, and controls the power switch M in a PWM scheme or in a PFM scheme to provide a primary current ipr. The flyback driver unit 10 may include one power switch or two power switches.

The transformer 200 includes a primary coil Lpr and a plurality of secondary coils Lse that are inductively coupled in parallel to the primary coil Lpr. The primary coil Lpr receives the primary current ipr to generate primary energy. Using the primary energy from the primary coil Lpr, the secondary primary coils Lse induce secondary energy in parallel. Although FIG. 3 illustrates only two (i.e., first and second) secondary coils Lse1 and Lse2, the first and second secondary coils Lse1 and Lse2 may be repeatedly arranged in parallel to constitute a plurality of secondary coils.

The rectifier unit 200 includes a plurality of rectifier diodes that rectify secondary currents induced from the secondary coils Lse of the transformer 100.

The clamp circuit unit 300 includes a plurality of clamp diodes that are connected in series to the corresponding rectifier diodes of the rectifier unit 200 in a forward direction. Each of the clamp diodes clamps a ringing voltage across the corresponding rectifier diode at the time when the power switch M is turned on.

As described above, the transformer 100 may include a plurality of secondary coils Lse. For conciseness, each embodiment of the present invention will be described using an exemplary case where the transformer 100 includes the two secondary coils Lse, i.e., the first and second secondary coils Lse1 and Lse2.

In an embodiment of the flyback DC/DC converter according to the present invention, the transformer 100 includes a first secondary coil Lse1 and a second secondary coil Lse2. One end of the first secondary coil Lse1 is connected to the positive output terminal OUT-P to induce the energy from the primary coil Lpr. The second secondary coil Lse2 is connected between the other end of the first secondary coil Lse1 and the negative output terminal OUT-N to induce the energy from the primary coil Lpr.

In this case, the rectifier unit 200 includes a first rectifier diode D10, a second rectifier diode D20, and an intermediate rectifier diode unit D30. The first rectifier diode D10 is connected between the first secondary coil Lse1 and the positive output terminal OUT-P. The second rectifier diode D20 is connected between the second secondary coil Lse2 and the negative output terminal OUT-N. The intermediate rectifier diode unit D30 is connected between the first secondary coil Lse1 and the second secondary coil Lse2.

The intermediate rectifier diode unit D30 and the clamp circuit unit 300 will be described in detail later in each embodiment of the present invention. Hereinafter, any overlapping description will be omitted for conciseness.

Figure 4:
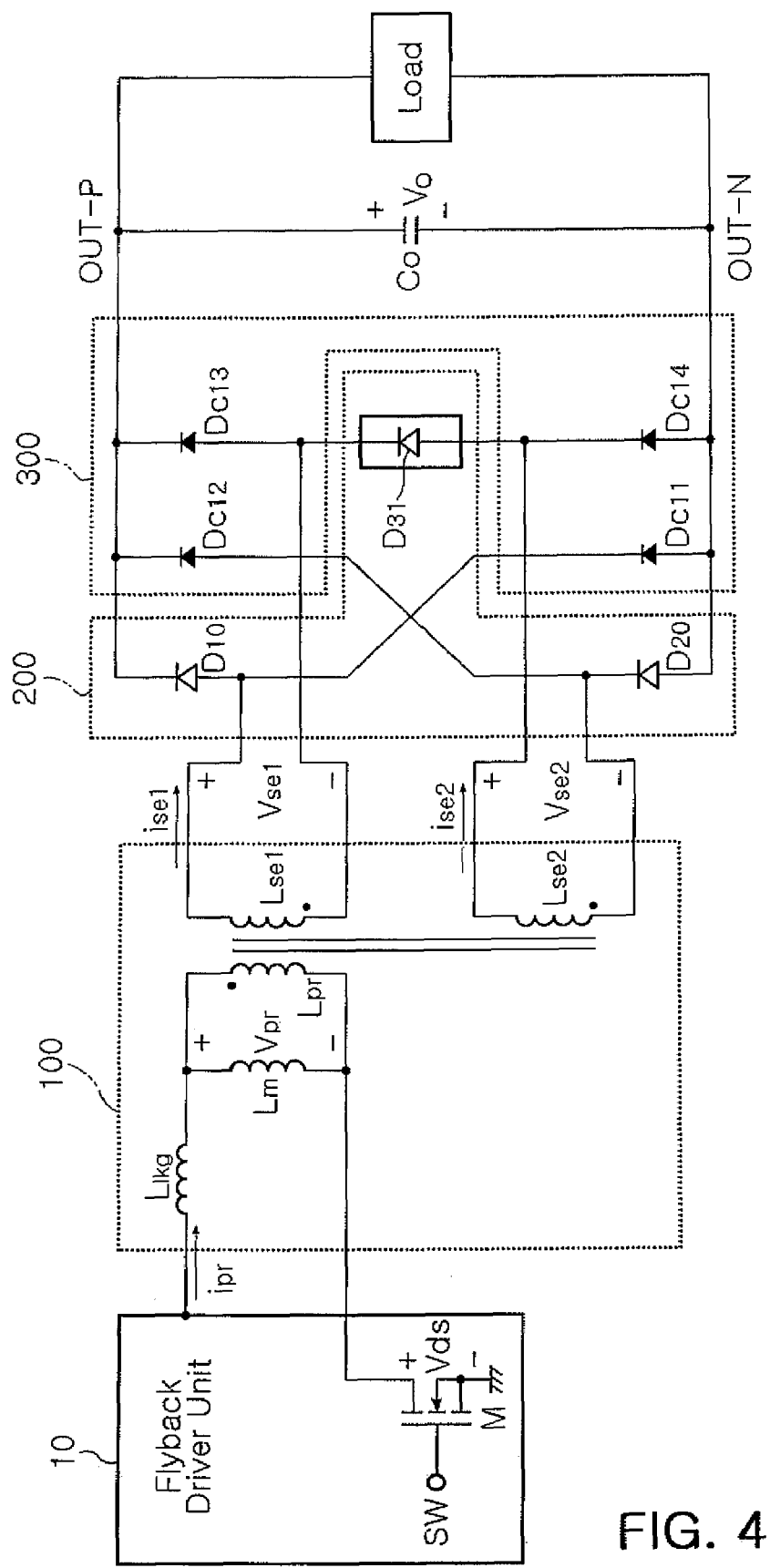
FIG. 4 is a detailed circuit diagram illustrating the detailed structures of a rectifier unit and a clamp circuit unit according to a first embodiment of the present invention.

FIG. 4 is a detailed circuit diagram illustrating the detailed structures of the rectifier unit 200 and the clamp circuit unit 300 according to a first embodiment of the present invention.

Referring to FIG. 4, the intermediate rectifier diode unit D30 includes a third rectifier diode D31 that is connected between the first secondary coil Lse1 and the second secondary coil Lse2.

In this case, as illustrated in FIGS. 3 and 4, the clamp circuit unit 300 includes a first clamp diode Dc11, a second clamp diode Dc12, a third clamp diode Dc13, and a fourth clamp diode Dc14. The first clamp diode Dc11 is connected between the first rectifier diode D10 and the negative output terminal OUT-N to clamp a ringing voltage across the first rectifier diode D10. The second clamp diode Dc12 is connected between the second rectifier diode D10 and the positive output terminal OUT-P to clamp a ringing voltage across the second rectifier diode D20. The third clamp diode Dc13 is connected between the intermediate rectifier diode unit D30 and the positive output terminal OUT-P. The fourth clamp diode Dc14 is connected between the intermediate rectifier diode unit D30 and the negative output terminal OUT-N to clamp a ringing voltage across the intermediate rectifier diode unit D30 in cooperation with the third clamp diode Dc13.

FIGS. 5(a) and 5(b) are diagrams illustrating conduction paths in respective operation modes of the flyback DC/DC converter illustrated in FIG. 4.

FIG. 5(a) illustrates a conduction path in an energy storage mode in which energy is stored in the transformer 100 when the power switch M is turned on. FIG. 5(b) illustrates a conduction path in a powering/reset mode in which the energy stored in the transformer 100 is transferred to an output side when the power switch M is turned off.

Figure 6:
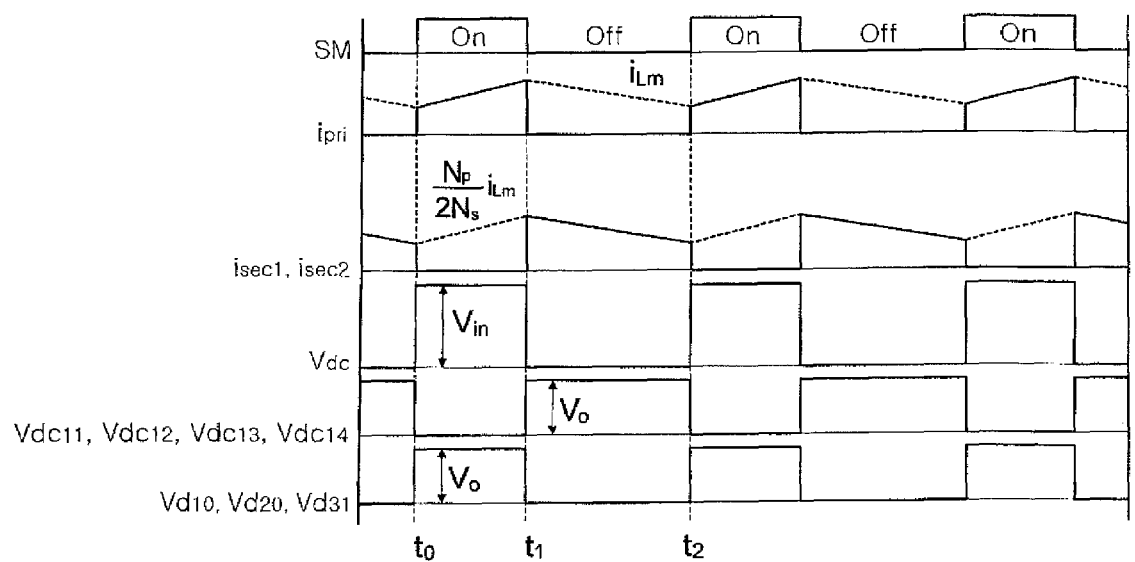
FIG. 6 is a waveform diagram of the main signals of the flyback DC/DC converter illustrated in FIG. 4.

FIG. 6 is a waveform diagram of the main signals of the flyback DC/DC converter illustrated in FIG. 4.

In FIG. 6, "SM" indicates an ON/OFF state of the power switch M, and "ipr" indicates the primary current. "ise1" and "ise2" indicate the secondary current. "Vdc11~Vdc14" indicate voltages applied across the corresponding clamp diodes. "Vd10, Vd20, Vd31" indicate voltages applied across the corresponding rectifier diodes.

Figure 7:
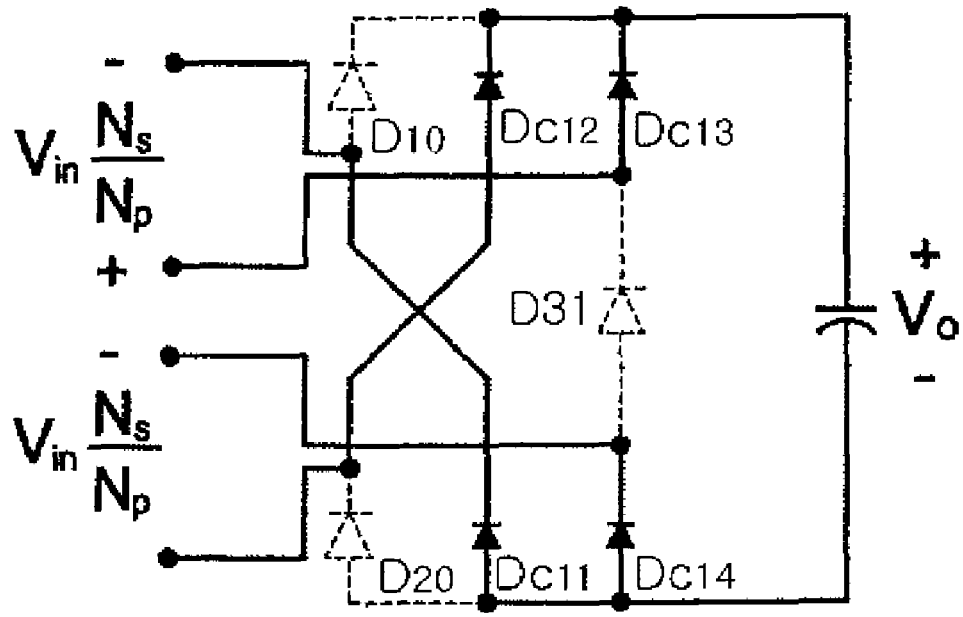
FIG. 7 is a diagram illustrating the operating conditions of the flyback DC/DC converter illustrated in FIG. 4.

FIG. 7 is a diagram illustrating the operating conditions of the flyback DC/DC converter illustrated in FIG. 4.

Referring to FIG. 7, each clamp diode normally performs a clamping operation if the maximum voltage $$\text{Vin\_max} \frac{Ns}{Np}$$

of the secondary side of the transformer 100 in FIG. 4 is lower than the minimum output voltage Vo_min.

Figure 8:
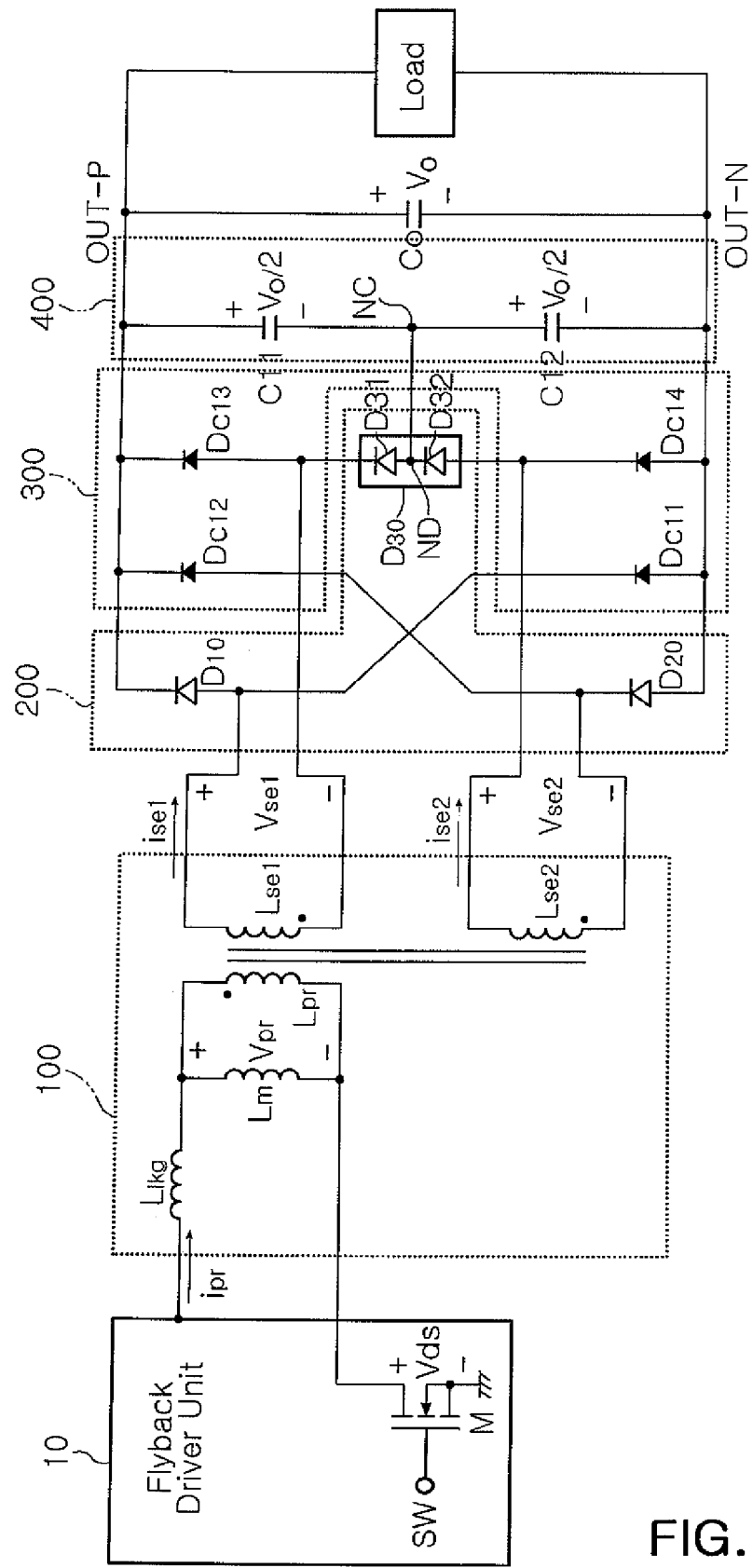
FIG. 8 is a detailed circuit diagram illustrating the detailed structures of a rectifier unit and a clamp circuit unit according to a second embodiment of the present invention.

FIG. 8 is a detailed circuit diagram illustrating the detailed structures of the rectifier unit 200 and the clamp circuit unit 300 according to a second embodiment of the present invention.

Referring to FIG. 8, the intermediate rectifier diode unit D30 includes a third rectifier diode D31 and a fourth rectifier diode D32 that are connected in series between the first secondary coil Lse1 and the second secondary coil Lse2.

Figure 5:
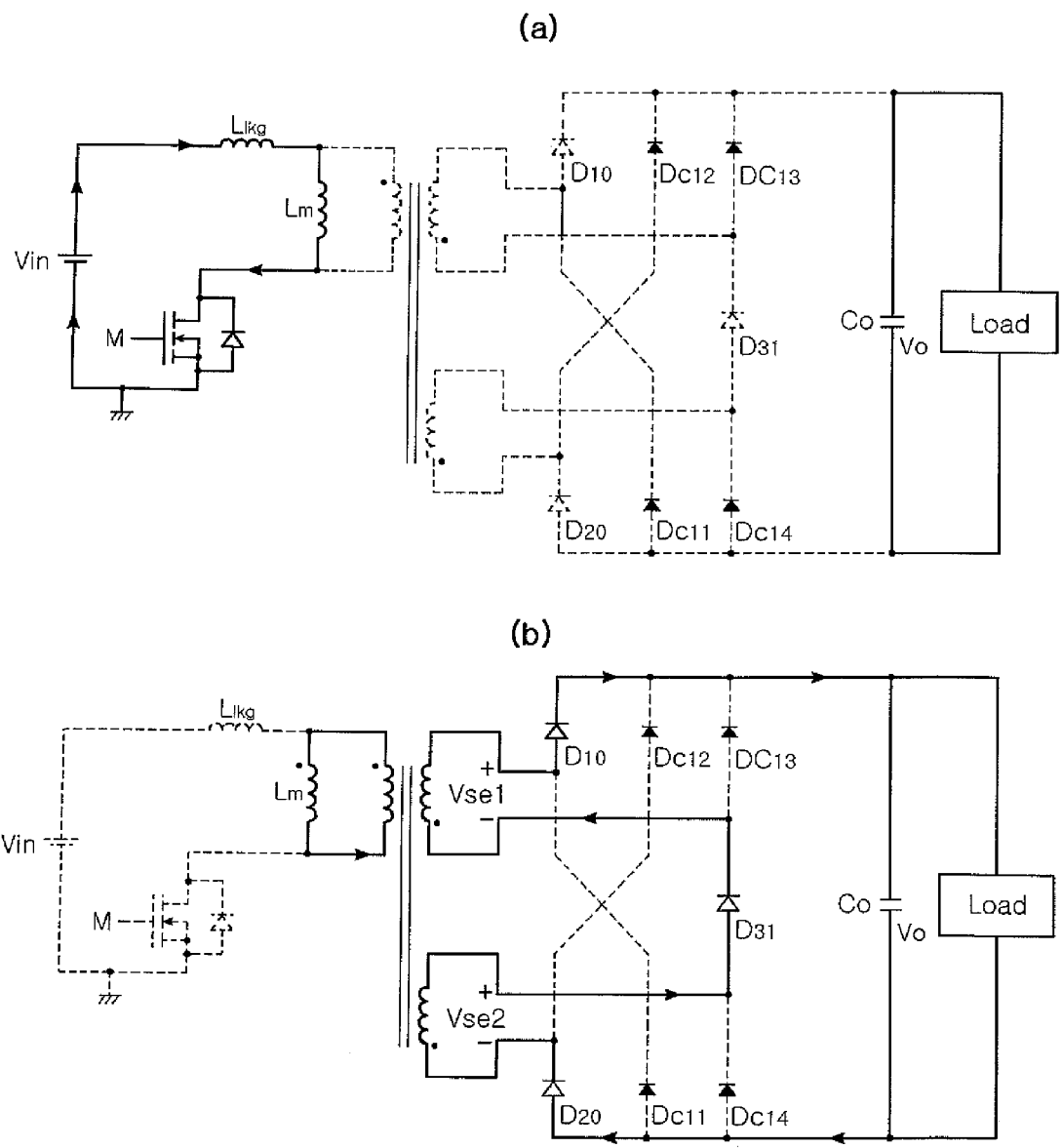
FIGS. 5(a) and 5(b) are diagrams illustrating conduction paths in respective operation modes of the flyback DC/DC converter illustrated in FIG. 4.

In this case, as illustrated in FIGS. 3 and 5, the clamp circuit unit 300 includes a first clamp diode Dc11, a second clamp diode Dc12, a third clamp diode Dc13, and a fourth clamp diode Dc14. The first clamp diode Dc11 is connected between the first rectifier diode D10 and the negative output terminal OUT-N to clamp a ringing voltage across the first rectifier diode D10. The second clamp diode Dc12 is connected between the second rectifier diode D10 and the positive output terminal OUT-P to clamp a ringing voltage across the second rectifier diode D20. The third clamp diode Dc13 is connected between the third rectifier diode D31 and the positive output terminal OUT-P. The fourth clamp diode Dc14 is connected between the fourth rectifier diode D32 and the negative output terminal OUT-N to clamp a ringing voltage across the third and fourth rectifier diodes unit D30 in cooperation with the third clamp diode Dc13.

In order to allow a voltage across the third and fourth rectifier diodes D31 and D32 to be as low as possible, the clamp circuit unit 300 may further include a first capacitor C11 and a second capacitor C12 that divide the output voltage Vo between the positive output terminal OUT-P and the negative output terminal OUT-N. A connection node NC between the first and second capacitors C11 and C12 is connected to a connection node ND between the third and fourth rectifier diodes D31 and D41.

Alternatively, the clamp circuit unit 300 may further include only one of the first and second capacitors C11 and C12 in order to enable a voltage across the third and fourth rectifier diodes D31 and D32 to be as low as possible.

At this point, the first and second capacitors C11 and C12 are set to have the same value such to equalize a voltage across the third rectifier diode D31 and a voltage across the fourth rectifier diode D32.

Figure 9:
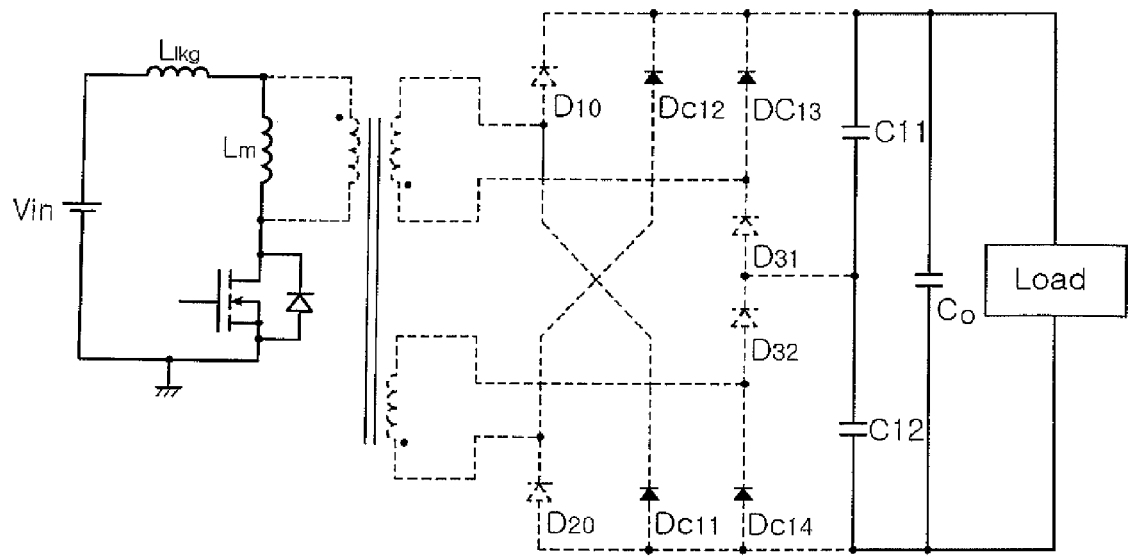
FIG. 9 is a diagram illustrating conduction paths in respective operation modes of the flyback DC/DC converter illustrated in FIG. 8.
Figure 9:
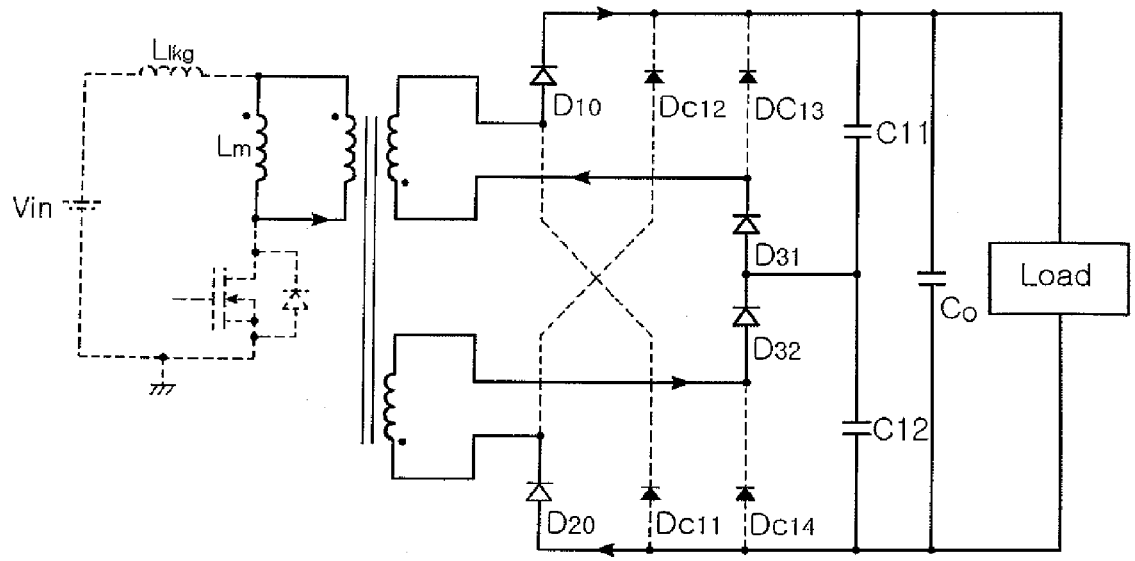

FIG. 9(a) and FIG. 9(b) are diagrams illustrating conduction paths in respective operation modes of the flyback DC/DC converter illustrated in FIG. 8.

FIG. 9(a) illustrates a conduction path in an energy storage mode in which energy is stored in the transformer 100 when the power switch M is turned on. FIG. 9(b) illustrates a conduction path in a powering/reset mode in which the energy stored in the transformer 100 is transferred to an output side when the power switch M is turned off.

Figure 10:
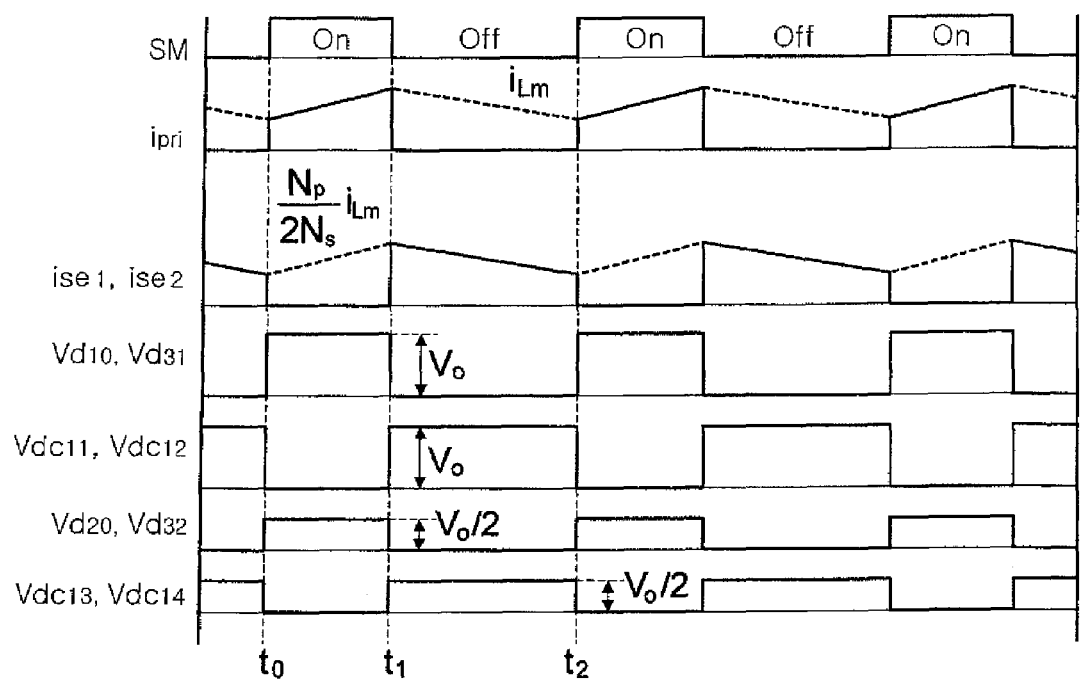
FIG. 10 is a waveform diagram of the main signals of the flyback DC/DC converter illustrated in FIG. 8.

FIG. 10 is a waveform diagram of the main signals of the flyback DC/DC converter illustrated in FIG. 8.

In FIG. 10, "SM" indicates an ON/OFF state of the power switch M, and "ipr" indicates the primary current. "ise1" and "ise2" indicate the secondary current. Vdc11~Vdc14 indicate voltages applied across the corresponding clamp diodes. Vd10, Vd20, Vd31, Vd32 indicate voltages applied across the corresponding rectifier diodes.

Figure 11:
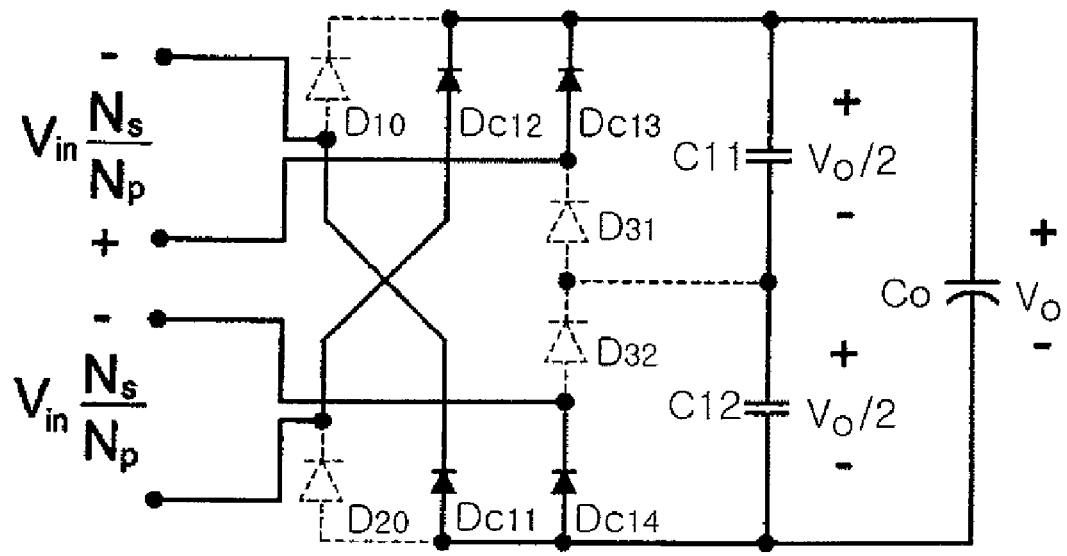
FIG. 11 is a diagram illustrating the operating conditions of the flyback DC/DC converter illustrated in FIG. 8.

FIG. 11 is a diagram illustrating the operating conditions of the flyback DC/DC converter illustrated in FIG. 8.

Referring to FIG. 11, each clamp diode normally performs a clamping operation if the maximum voltage $$\text{Vin\_max} \frac{Ns}{Np}$$

of the secondary side of the transformer 100 in FIG. 4 is lower than the minimum output voltage Vo_min.

Figure 12A:
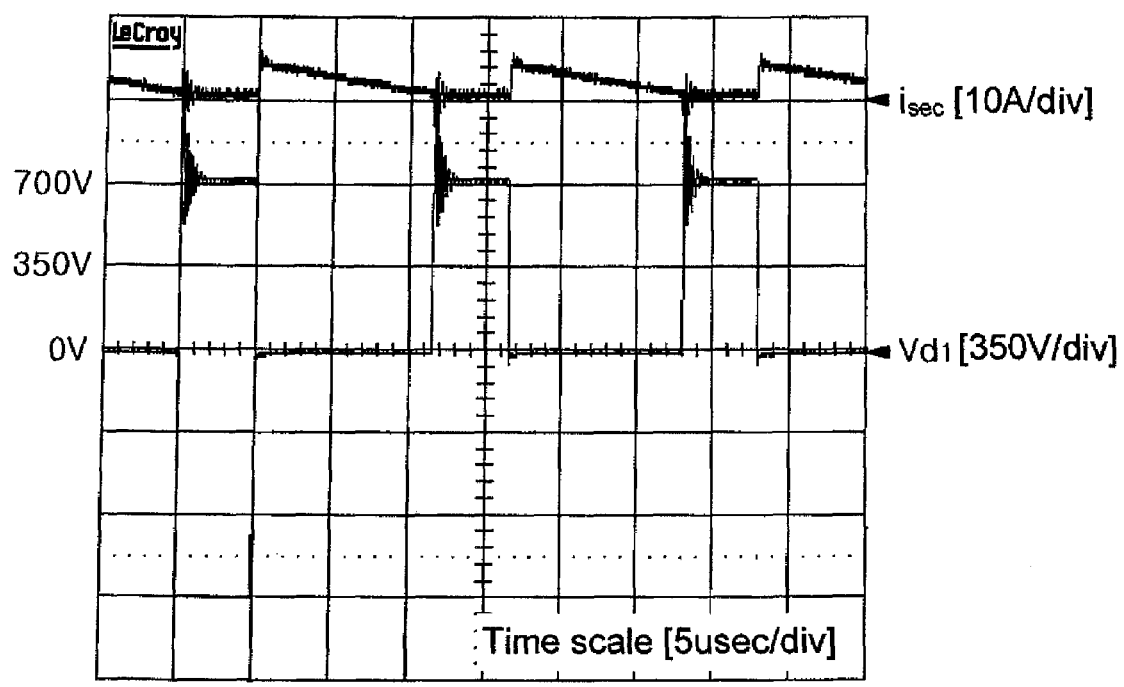
FIGS. 12a, 12b and 12c are graphs illustrating a voltage across the conventional rectifier diode in FIG. 1 and a voltage across each of the rectifier diodes in FIG. 8.
Figure 12B:
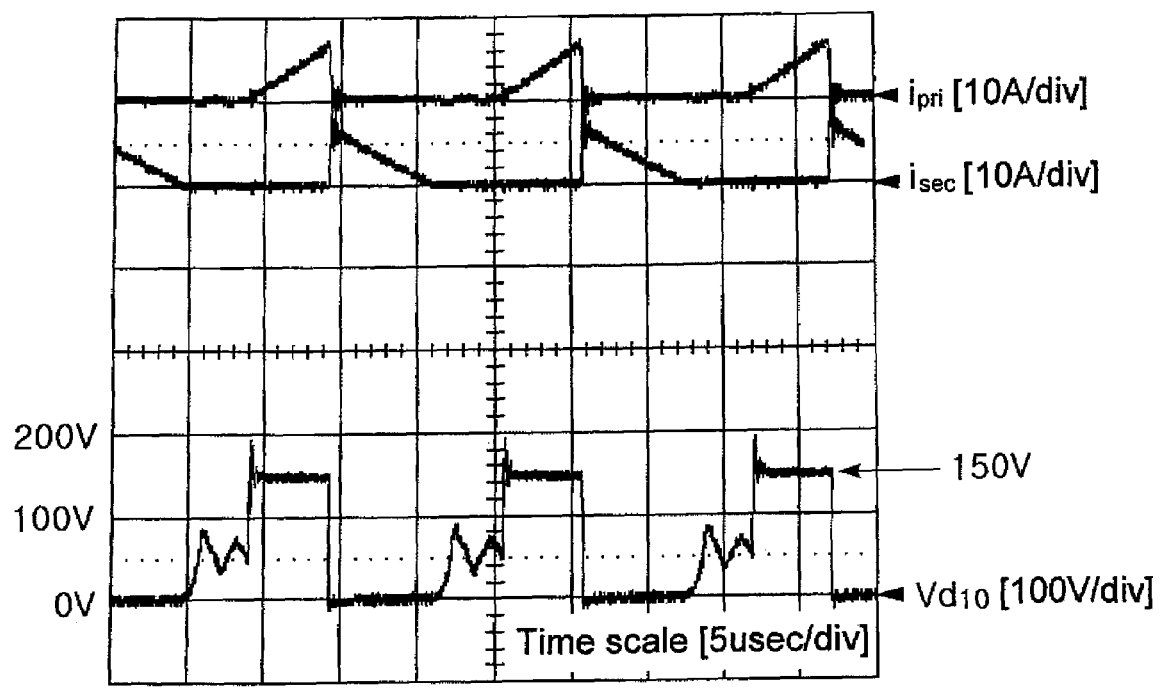
Figure 12C:
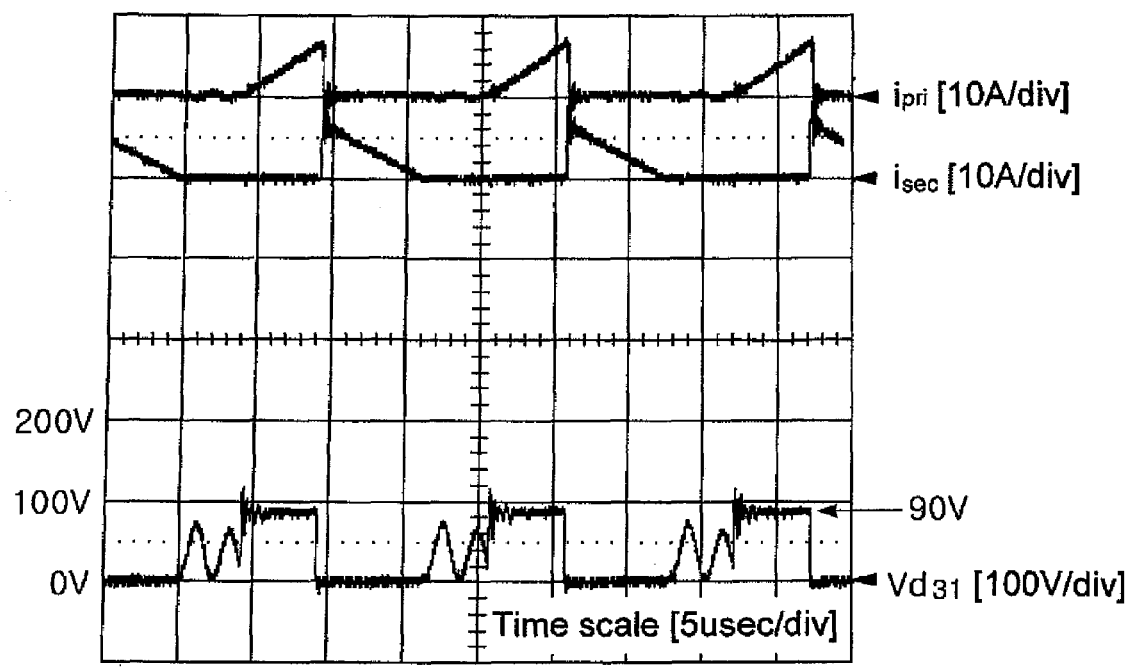

FIGS. 12a, 12b and 12c are graphs illustrating a voltage across the conventional rectifier diode in FIG. 1 and a voltage across each of the rectifier diodes in FIG. 8.

FIG. 12a illustrates a waveform of a voltage applied across the conventional rectifier diode in FIG. 1. FIG. 12b illustrates a waveform of a voltage applied across the third and fourth rectifier diodes D31 and D32 in FIG. 8. FIG. 12c illustrates a waveform of a voltage applied across the first and second rectifier diodes D10 and D20 in FIG. 8.

Figure 13:
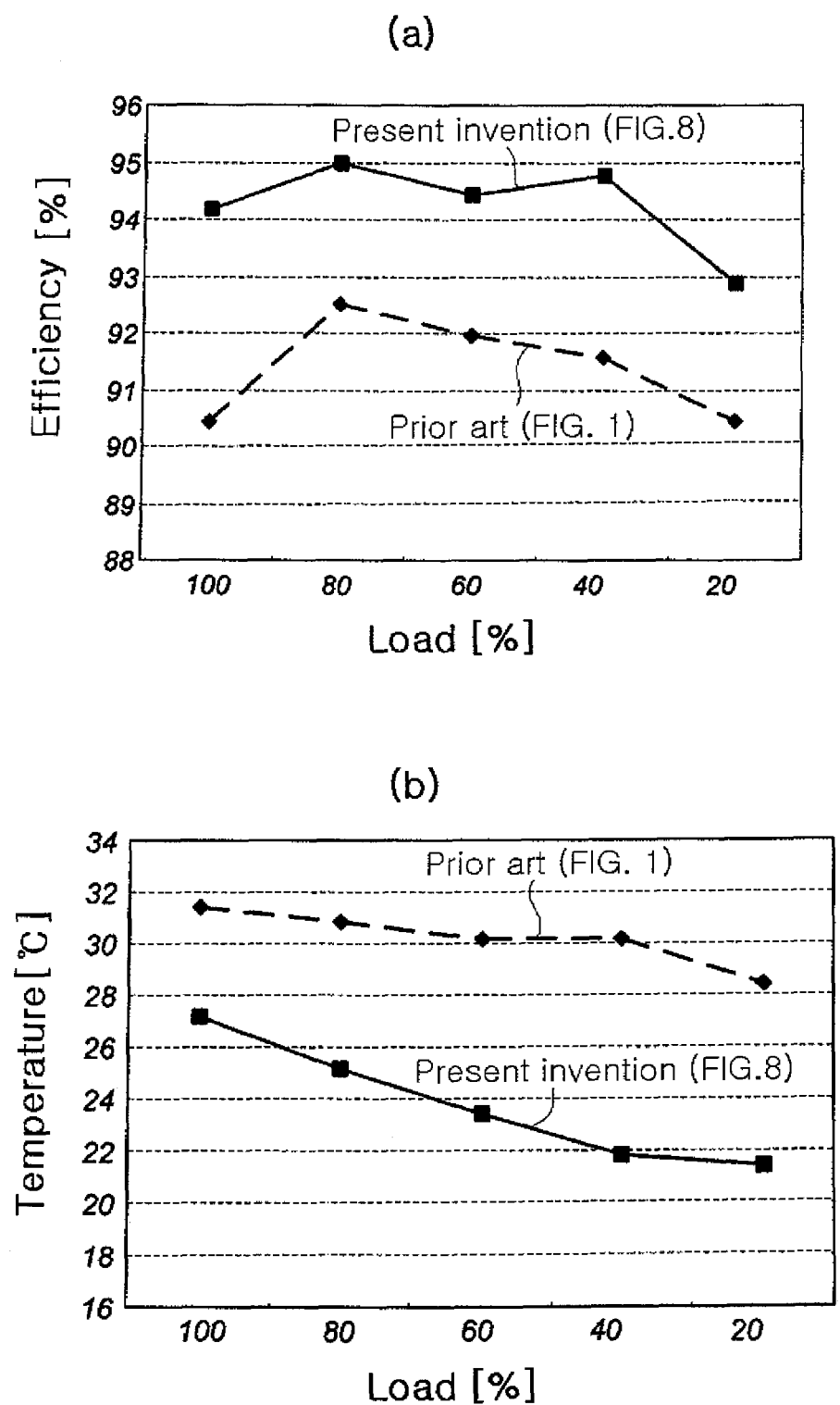
FIGS. 13(a) and 13(b) are graphs illustrating the efficiency and the amount of generated heat according to the present invention and the efficiency and the amount of the generated heat according to the prior art.

FIGS. 13(a) and 13(b) are graphs illustrating the efficiency and the amount of generated heat according to the present invention and the efficiency and the amount of the generated heat according to the prior art.

FIG. 13(a) is a graph for comparing the efficiency according to the present invention with the efficiency according to the prior art. FIG. 13(b) is a graph for comparing the amount of generated heat according to the present invention with the amount of generated heat according to the prior art.

Hereinafter, the operation and effect of the present invention will be described in detail with reference to the accompanying drawings.

The operation of the flyback DC/DC converter using the clamp diodes according to the present invention will be described in detail with reference to FIGS. 3 to 13.

Referring to FIG. 3, in the flyback DC/DC converter, the flyback driver unit 10 controls the power switch M in a PWM scheme or in a PFM scheme to DC/DC-convert an input voltage. At this point, the output voltage Vo between the positive output terminal OUT-P and the negative output terminal OUT-N is smoothed by the smoothing output capacitor Co into a more stable DC voltage.

When the power switch M is turned on, an input voltage is applied across the magnetization inductor Lm in the transformer 100 such that electrical energy is stored in the magnetization inductor Lm. Thereafter, when the power switch M is turned off, the stored electrical energy flows toward the secondary coil Lse in accordance with the polarity (indicated by dots) of the transformer 100. Consequently, Input energy is transferred from the primary coil Lpr to the secondary coil Lse of the transformer 100.

The rectifier unit 200 has a plurality of rectifier diodes that rectify the secondary currents ise of the corresponding secondary coils in the transformer 100. At this point, all the rectifier diodes are connected between the positive output terminal OUT-P and the negative output terminal OUT-N in a forward direction, thereby half-wave rectifying the secondary currents.

The clamp circuit unit 300 includes a plurality of clamp diodes that are connected in series to the corresponding rectifier diodes of the rectifier unit 200 in a forward direction to clamp ringing voltages across the corresponding rectifier diodes at the time when the power switch M is turned off.

When the transformer 100 includes two secondary coils (i.e., first and second secondary coils Lse1 and Lse2) as illustrated in FIG. 3, the first and second secondary coils Lse1 and Lse2 induce magnetic energy using energy from the primary coil Lpr, thereby providing first and second secondary currents ise1 and ise2 corresponding to the induced energy.

The rectifier unit 200 includes the first rectifier diode D10, the secondary rectifier diode D20, and the intermediate rectifier diode unit D30, and rectifies the respective secondary currents from the first and second secondary coils Lse1 and Lse2.

Hereinafter, the rectifier unit 200 and the clamp circuit unit 300 according to each embodiment of the present invention will be described in detail.

The rectifier unit 200 and the clamp circuit unit 300 according to the first embodiment of the present invention will now be described in detail with reference to FIGS. 4 to 7.

Referring to FIG. 4, the intermediate rectifier diode unit D30 of the rectifier unit 200 includes the third rectifier diode D31 that is connected between the first secondary coil Lse1 and the second secondary coil Lse2.

As illustrated in FIG. 5(a), while the power switch M of the flyback driver unit 10 is turned on, the flyback DC/DC converter operates in an energy storage mode in which energy generated by the primary current ipr of the flyback driver unit 10 is stored in the magnetization inductor Lm of the transformer 100. As illustrated in FIG. 5(b), while the power switch M of the flyback driver unit 10 is turned off, the flyback DC/DC converter operates in a powering/reset mode in which the energy stored in the magnetization inductor Lm of the transformer 100 is transferred to the output side in the form of a current.

Referring to FIG. 5(b), in the powering/reset mode, the transferred energy, i.e., the secondary currents ise1 and ise2 are rectified by the rectifier unit 200, and the rectified currents charge the output capacitor Co.

The voltages across the rectifier diodes of the rectifier unit 200 are clamped by the clamp circuit unit 300, which will be described in detail below.

Referring to FIGS. 4 and 5(b), the first clamp diode Dc11 of the clamp circuit unit 300 clamps a ringing voltage applied across the first rectifier diode D10. Because the output capacitor Co is connected in parallel to a serial circuit of the first rectifier diode D10 and the first clam diode Dc11, an output voltage Vo across the output capacitor Co is equal to a voltage across the diodes D10 and Dc11. Therefore, when the first rectifier diode D10 is turned off, a voltage across the first rectifier diode D10 is equal to the output voltage Vo. For example, when the voltage across the first rectifier diode D10 increases by the ringing voltage due to the resonance of the leakage inductor Llkg and the junction capacitor Cj of the first rectifier diode D10, the resulting voltage higher than the output voltage Vo is rectified by the first clamp diode Dc11. As a result, the voltage across the first rectifier diode D10 is clamped into the output voltage.

According to the above principle, the second clamp diode Dc12 clamps a ringing voltage across the second rectifier diode D20, and the third and fourth clamp diodes Dc13 and Dc14 clamp a ringing voltage across the third rectifier diode D31.

This principle is similarly applied to each embodiment of the present invention.

Figure 2:
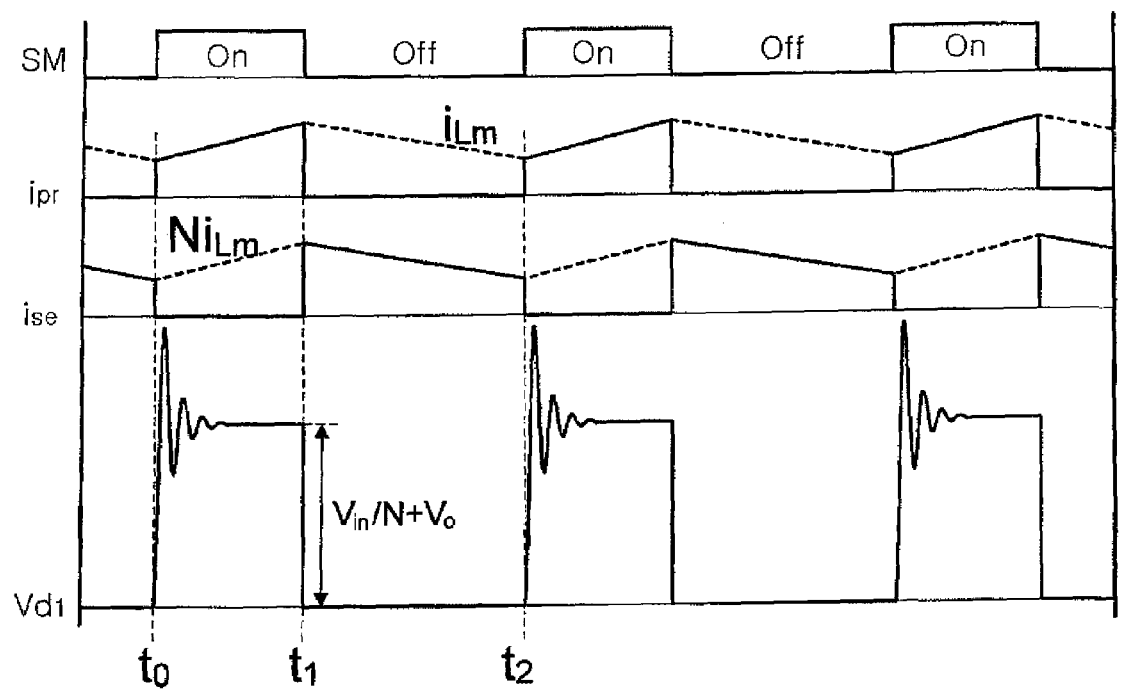
FIG. 2 is a waveform diagram of the main signals of the conventional flyback DC/DC converter illustrated in FIG. 1.

By the clamp circuit unit 300, the voltages Vd10, Vd20 and Vd31 applied across the respective rectifier diodes D10, D20 and D31 become stable voltages without a ringing voltage, unlike the voltage applied across the rectifier diode of FIG. 2.

Therefore, when compared to the prior art, a rectifier diode with a lower breakdown voltage can be used in the flyback DC/DC converter of the present invention.

The operating conditions of the flyback DC/DC converter in FIG. 4 will now be described with reference to FIG. 7.

Referring to FIG. 7, in the case of the conduction mode of the power switch M, the input energy can be stored in the magnetization inductor of the transformer only when. Otherwise, if all the rectifier diodes are not turned off, a large current flows through the clamp diodes Dc11, Dc12, Dc13 and Dc14 of the clamp circuit unit 300. In this case, a diode with a small current rating below about 1 ampere [A] cannot be used and a normal flyback operation is impossible. Therefore, as illustrated in FIG. 7, the rectifier unit 200 must be set such that the maximum input voltage $$\text{Vin\_max}\frac{Ns}{Np}$$

is lower than the minimum output voltage Vo_min during the conduction mode of the power switch M. That is, the maximum output voltage $$\text{Vin\_max}\frac{Ns}{Np}$$

of the secondary voltage of the transformer 100 must be lower than the minimum output voltage Vo_min so that the clamp diode can perform a normal clamp operation.

These operating conditions of the flyback DC/DC converter in FIG. 4 can be expressed as Equation (1) below.

$$\text{Vin\_max}\frac{Ns}{Np} < \text{Vo\_min} \equiv \frac{Ns}{Np} < \frac{\text{Vo\_min}}{\text{Vin\_max}} \quad (1)$$

where Vin_max is the maximum voltage of the secondary side of the transformer 100, Vo_min is the minimum output voltage of the clamp circuit unit 300, Np is the number of primary turns of the transformer 100, and Ns is the number of secondary turns of the transformer 100.

The rectifier unit 200 and the clamp circuit unit 300 according to the second embodiment of the present invention will now be described in detail with reference to FIGS. 8 to 13.

Referring to FIG. 8, the intermediate rectifier diode unit D30 of the rectifier unit 200 includes the third and fourth rectifier diodes D31 and D32 that are connected in series between the first secondary coil Lse1 and the second secondary coil Lse2.

As illustrated in FIG. 9(a), while the power switch M of the flyback driver unit 10 is turned on, the flyback DC/DC converter operates in an energy storage mode in which energy generated by the primary current ipr of the flyback driver unit 10 is stored in the magnetization inductor Lm of the transformer 100. As illustrated in FIG. 9(b), while the power switch M of the flyback driver unit 10 is turned off, the flyback DC/DC converter operates in a powering/reset mode in which the energy stored in the magnetization inductor Lm of the transformer 100 is transferred to the output side in the form of a current.

In addition, the output voltage Vo between the positive output terminal OUT-P and the negative output terminal OUT-N is divided by the first and second capacitors C11 and C12. When the first and second capacitors C11 and C12 are set to have the same value, a voltage across the third rectifier diode D31 connected in parallel to the first capacitor C11 is equal to a voltage across the fourth rectifier diode D32 connected in parallel to the second capacitor C12.

Accordingly, the half (½) of the output voltage Vo is applied across the first capacitor C11 and also the other half of the output voltage Vo is applied across the second capacitor C12. That is, the ½ output voltage Vo/2 is applied across the third rectifier diode D31 and also the other ½ output voltage Vo/2 is applied across the fourth rectifier diode D32. Consequently, it is possible that each of the voltages applied across the third and fourth rectifier diodes D31 and D32 is not higher than the ½ output voltage Vo/2.

As described above, the third and fourth diodes D31 and D32 are clamped to the output voltage and the output voltage is equally distributed by the first and second capacitors to the third and fourth rectifier diodes. Therefore, the half of the output voltage is applied across each of the third and fourth rectifier diodes. Accordingly, a rectifier diode with a breakdown voltage equal to the half of the output voltage can be used in the flyback DC/DC converter.

Referring to FIG. 9(b), in the powering/reset mode, the transferred energy, i.e., the secondary currents ise1 and ise2 are rectified by the rectifier unit 200, and the rectified currents charge the output capacitor Co.

The voltages across the rectifier diodes of the rectifier unit 200 are clamped by the clamp circuit unit 300, as described with reference to FIGS. 4 and 5(b). Referring to FIGS. 8 and 9(b), the first clamp diode Dc11 of the clamp circuit unit 300 clamps a ringing voltage applied across the first rectifier diode D10. The second clamp diode Dc12 of the clamp circuit unit 300 clamps a ringing voltage applied across the second rectifier diode D20. The third and fourth clamp diodes Dc13 and DC14 of the clamp circuit unit 300 clamp ringing voltages applied across the third and fourth rectifier diodes D31 and D32.

By the clamp circuit unit 300, the voltage applied across each of the rectifier diodes become stable voltages without a ringing voltage, as illustrated in FIG. 10.

The operating conditions of the flyback DC/DC converter in FIG. 8 will now be described with reference to FIG. 11.

Referring to FIG. 11, in the case of the conduction mode of the power switch M, the input energy can be stored in the magnetization inductor of the transformer only when. Otherwise, if all the rectifier diodes are not turned off, a large current flows through the clamp diodes Dc11, Dc12, Dc13 and Dc14 of the clamp circuit unit 300. In this case, a diode with a capacity of about 1 ampere [A] cannot be used and a normal flyback operation is impossible.

Accordingly, as illustrated in FIG. 11, the rectifier unit 200 must be set such that the maximum input voltage $$\text{Vin\_max} \frac{Ns}{Np}$$

is lower than the minimum output voltage Vo_min during the conduction mode of the power switch M. That is, the maximum output voltage $$\text{Vin\_max} \frac{Ns}{Np}$$

of the secondary voltage of the transformer 100 must be lower than the minimum output voltage Vo_min so that the clamp diode can perform a normal clamp operation.

These operating conditions of the flyback DC/DC converter in FIG. 8 can be expressed as Equation (1) above.

FIG. 12a illustrates a waveform of a voltage applied across the conventional rectifier diode in FIG. 1. FIG. 12b illustrates a waveform of a voltage applied across the third and fourth rectifier diodes D31 and D32 in FIG. 8. FIG. 12c illustrates a waveform of a voltage applied across the first and second rectifier diodes D10 and D20 in FIG. 8. Referring to FIG. 12a, the voltage across the conventional rectifier diode in FIG. 1 is as high as about 700 V. Referring to FIG. 12b, the voltage across each of the first and second rectifier diodes D10 and D20 in FIG. 8 is about 150 V. Referring to FIG. 12c, the voltage across each of the third and fourth rectifier diodes D31 and D32 is about 90 V. That is, it can be seen that the voltage across the rectifier diode of the present invention is much lower than the voltage across the conventional rectifier diode in FIG. 1.

FIG. 13(a) is a graph illustrating the efficiency according to the present invention and the efficiency according to the prior art. FIG. 13(b) is a graph illustrating the amount of generated heat according to the present invention with the amount of generated heat according to the prior art. As can be seen from FIG. 13(a), the efficiency of the flyback DC/DC converter according to the present invention is higher than that of the conventional flyback DC/DC converter. In addition, as can be seen from FIG. 13(b), the amount of heat generated in the flyback DC/DC converter according to the present invention is smaller than the amount of heat generated in the conventional flyback DC/DC converter.

As described above, the voltage across the rectifier diode on the secondary side can be reduced such that it is lower than the output voltage. Also, the ringing voltage of the rectifier diode can be removed to reduce the voltage stress remarkably. Also, the efficiency of the flyback DC/DC converter can be enhanced because the snubber circuit is unnecessary.

In addition, because the voltage across the rectifier diode can be reduced using the clamp diode, an inexpensive rectifier diode can be used. Accordingly, the flyback DC/DC converter can be manufactured inexpensively.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A flyback DC/DC converter that has a smoothing output capacitor connected between a positive output terminal and a negative output terminal and performs a DC/DC conversion operation using a power switch, the flyback DC/DC converter comprising:
   a flyback driver unit for providing a primary current;
   a transformer including a plurality of secondary coils for inducing energy from the primary coil receiving the primary current;
   a rectifier unit including a plurality of rectifier diodes for rectifying secondary currents of the corresponding secondary coils of the transformer; and a plurality of clamp diodes connected in series to the corresponding rectifier diodes of the rectifier unit in a forward direction to clamp ringing voltage across the corresponding rectifier diodes when the power switch is turned off.

2. The flyback DC/DC converter of claim 1, wherein the transformer comprises:
   a first secondary coil having one end connected to the positive output terminal and inducing energy from the primary coil; and
   a second secondary coil connected between the negative output terminal and the other end of the first secondary coil to induce energy from the primary coil.

3. The flyback DC/DC converter of claim 2, wherein the rectifier unit comprises:
   a first rectifier diode connected between the positive output terminal and the first secondary coil of the transformer;
   a second rectifier diode connected between the negative output terminal and the second secondary coil of the transformer; and
   an intermediate rectifier diode unit connected between the first secondary coil and the second secondary coil of the transformer.

4. The flyback DC/DC converter of claim 3, wherein the intermediate rectifier diode unit comprises a third rectifier diode connected between the first secondary coil and the second secondary coil of the transformer.

5. The flyback DC/DC converter of claim 4, wherein the clamp circuit unit comprises:
   a first clamp diode connected between the negative output terminal and the first rectifier diode to clamp a ringing voltage across the first rectifier diode;
   a second clamp diode connected between the positive output terminal and the second rectifier diode to clamp a ringing voltage across the second rectifier diode;
   a third clamp diode connected between the positive output terminal and the intermediate rectifier diode unit; and
   a fourth clamp diode connected between the negative output terminal and the intermediate rectifier diode unit to clamp a ringing voltage across the intermediate rectifier diode unit in cooperation with the third clamp diode.

6. The flyback DC/DC converter of claim 5, wherein the rectifier unit is set such that the maximum input voltage is lower than the minimum output voltage.

7. The flyback DC/DC converter of claim 3, wherein the intermediate rectifier diode unit comprises a third rectifier diode and a fourth rectifier diode that are connected in series between the first secondary coil and the second secondary coil.

8. The flyback DC/DC converter of claim 7, wherein the clamp circuit unit comprises:
   a first clamp diode connected between the negative output terminal and the first rectifier diode to clamp a ringing voltage across the first rectifier diode;
   a second clamp diode connected between the positive output terminal and the second rectifier diode to clamp a ringing voltage across the second rectifier diode;
   a third clamp diode connected between the positive output terminal and the third rectifier diode unit; and
   a fourth clamp diode connected between the negative output terminal and the fourth rectifier diode to clamp a ringing voltage across the third and fourth rectifier diodes in cooperation with the third clamp diode.

9. The flyback DC/DC converter of claim 8, wherein the rectifier unit is set such that the maximum input voltage is lower than the minimum output voltage.

10. The flyback DC/DC converter of claim 8, wherein the clamp circuit unit further comprises a first capacitor and a second capacitor for dividing an output voltage between the positive output terminal and the negative output terminal, a connection node between the first and second capacitors being connected to a connection node between the third and fourth rectifier diodes.

11. The flyback DC/DC converter of claim 10, wherein the first capacitor and the second capacitor are set to have the same value such that a voltage across the third rectifier diode is equal to a voltage across the fourth rectifier diode.

* * * * *